United States Patent [19]

Hutchins

[11] Patent Number: 4,930,751
[45] Date of Patent: Jun. 5, 1990

[54] COIL SPRING COMPRESSING TOOL
[76] Inventor: Willie R. Hutchins, Rte. 2, Box 183, Greenville, Ga. 30222
[21] Appl. No.: 396,082
[22] Filed: Aug. 21, 1989
[51] Int. Cl.$^5$ .............................. B25B 5/02; B60P 1/48
[52] U.S. Cl. ....................................... 254/10.5; 29/227
[58] Field of Search ................. 254/10.5; 29/225, 227, 29/238, 239, 256, 257, 259; 269/166, 253

[56] References Cited

U.S. PATENT DOCUMENTS

| | | | |
|---|---|---|---|
| 398,286 | 2/1889 | Speers | 29/239 |
| 1,372,350 | 3/1921 | Munn | 29/227 |
| 2,170,535 | 8/1939 | Marsden | 269/253 |
| 2,686,960 | 8/1954 | LeRoy | 269/253 |
| 3,132,843 | 5/1964 | Brocato | 254/10.5 |
| 3,946,987 | 3/1976 | Shultz . | |
| 4,009,867 | 3/1977 | Diffenderfer . | |
| 4,237,594 | 12/1980 | Young . | |
| 4,463,489 | 8/1984 | James | 29/259 |
| 4,541,614 | 9/1985 | Klann . | |
| 4,580,769 | 4/1986 | Pappas | 269/166 |
| 4,679,780 | 7/1987 | Kloster . | |

*Primary Examiner*—Robert C. Watson
*Attorney, Agent, or Firm*—Jerry T. Kearns

[57] ABSTRACT

A coil spring compressing tool for use in compressing suspension springs of cars and trucks includes a pair of elongated rectangular blocks extending in spaced parallel relation. A pair of parallel guide rods are slidably received through aligned apertures provided adjacent opposite end portions on each of the blocks. An enlarged retaining stop is secured at each end of each of the guide rods for limiting maximum separation of the blocks. An elongated threaded rod has a first end portion received for free rotation in a central bore formed through one of the blocks and a second end portion in threaded engagement with a threaded bore formed centrally through the other block. A driving head is provided on an end portion of the threaded rod for engagement with a wrench. A pair of oppositely directed hooks are secured at aligned positions on side faces of the blocks and are dimensioned for engagement with a coil spring. Rotation of the threaded rod causes the blocks to move together to compress a coil spring.

1 Claim, 3 Drawing Sheets

COIL SPRING COMPRESSING TOOL

BACKGROUND OF THE INVENTION

1. Field of the Invention

The present invention relates to coil spring compressing tools, and more particularly pertains to a coil spring compressing tool designed for use in compressing suspension springs of cars and trucks. Various suspension systems, for example strut types suspension systems, utilize shock absorbers surrounded by a coil spring. The access space around the coil spring is usually limited, especially on small cars, and prevents the use of a surrounding type spring compressing tool. While various types of spring compressors have been proposed in the prior art, these devices have a tendency to shift laterally in use, creating the possibility of a potentially dangerous release of a compressed spring. In order to overcome this problem, the present invention provides a simple and inexpensively constructed tool having a pair of spaced guide rods for preventing lateral movement of coil spring engaging oppositely directed hooks.

2. Description of the Prior Art

Various types of coil spring compressing tools are known in the prior art. A typical example of such a coil spring compressing tool is to be found in U.S. Pat. 3,946,987, which issued to W. Shultz on Mar. 30, 1976. This patent discloses a coil spring spreading tool having oppositely directed spring engaging hook members disposed on a threaded rod. U.S. Pat. 4,009,867, which issued to W. Diffenderfer on Mar. 1, 1977, discloses a spring compressor adapted for use with vehicle suspension strut assemblies. Two parallel end plates have apertures sized to allow insertion of the tubular shock assembly of the strut. Two end plates are joined by threaded support rods which allow the distance between the two end plates to be varied to compress the spring as desired. Pivoted latches allow the quick insertion or removal of the strut assembly from the spring compressor. U.S. Pat. 4,237,594, which issued to J. Young on Dec. 9, 1980, discloses a spring compressing tool for use on the suspension system of a vehicle. An elongated threaded rod includes a head disposed on one end adapted to be engaged by a common wrench for rotation. A plate having a central aperture receives the threaded rod while the spring is compressed. A hook assembly to engage the coil spring is designed to receive the threaded rod and travel therealong as the rod is rotated. U.S. Pat. 4,541,614, which issued to H. Klann on Sept. 17, 1985, discloses a spring compressing tool having a pair of spaced spring coil engaging members mounted on an elongated shaft. U.S. Pat. 4,679,780, which issued to K. Kloster on July 14, 1987, discloses a spring compressor including a pair of spaced shoes each having a helical groove for engaging a portion of a coil spring. Each shoe also includes a latchable locking device extendible over the respective helical groove for maintaining the coil of the spring within the groove during the compressing operation.

While the above mentioned devices are directed to coil spring compressing tools, none of these devices disclose a spring compressing tool utilizing a pair of spaced parallel blocks having aligned apertures adjacent each end slidably receiving a pair of spaced guide rods and connected for parallel axial movement by a centrally located elongated threaded rod. Inasmuch as the art is relatively crowded with respect to these various types of coil spring compressing tools, it can be appreciated that there is a continuing need for and interest in improvements to such coil spring compressing tools, and in this respect, the present invention addresses this need and interest.

SUMMARY OF THE INVENTION

In view of the foregoing disadvantages inherent in the known types of coil spring compressing tools now present in the prior art, the present invention provides an improved coil spring compressing tool. As such, the general purpose of the present invention, which will be described subsequently in greater detail, is to provide a new and improved coil spring compressing tool which has all the advantages of the prior art coil spring compressing tools and none of the disadvantages.

To attain this, a representative embodiment of the concepts of the present invention is illustrated in the drawings and makes use of a coil spring compressing tool for use in compressing suspension springs of cars and trucks which includes a pair of elongated rectangular blocks extending in spaced parallel relation. A pair of parallel guide rods are slidably received through aligned apertures provided adjacent opposite end portions on each of the blocks. An enlarged retaining stop is secured at each end of each of the guide rods for limiting maximum separation of the blocks. An elongated threaded rod has a first end portion received for free rotation in a central bore formed through one of the blocks and a second end portion in threaded engagement with a threaded bore formed centrally through the other block. A driving head is provided on an end portion of the threaded rod for engagement with a wrench. A pair of oppositely directed hooks are secured at aligned positions on side faces of the blocks and are dimensioned for engagement with a coil spring. Rotation of the threaded rod causes the blocks to move together to compress a coil spring.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved coil spring compressing tool which has all the advantages of the prior art coil spring compressing tools and none of the disadvantages.

It is another object of the present invention to provide a new and improved coil spring compressing tool which may be easily and efficiently manufactured and marketed.

It is a further object of the present invention to provide a new and improved coil spring compressing tool which is of a durable and reliable construction.

An even further object of the present invention is to provide a new and improved coil spring compressing tool which is susceptible of a low cost of manufacture with regard to both materials and labor, and which accordingly is then susceptible of low prices of sale to the consuming public, thereby making such coil spring compressing tools economically available to the buying public.

Still yet another object of the present invention is to provide a new and improved coil spring compressing tool which provides in the apparatuses and methods of the prior art some of the advantages thereof, while simultaneously overcoming some of the disadvantages normally associated therewith.

Still another object of the present invention is to provide a new and improved coil spring compressing tool for efficiently and safely compressing suspension springs on cars and trucks.

Yet another object of the present invention is to provide a new and improved coil spring compressing tool including a pair of blocks secured for relative axial movement by spaced guide rods to prevent lateral movement or twisting of the blocks during a spring compressing operation.

Even still another object of the present invention is to provide a new and improved coil spring compressing tool usable in a limited access space adjacent a vehicle suspension system.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
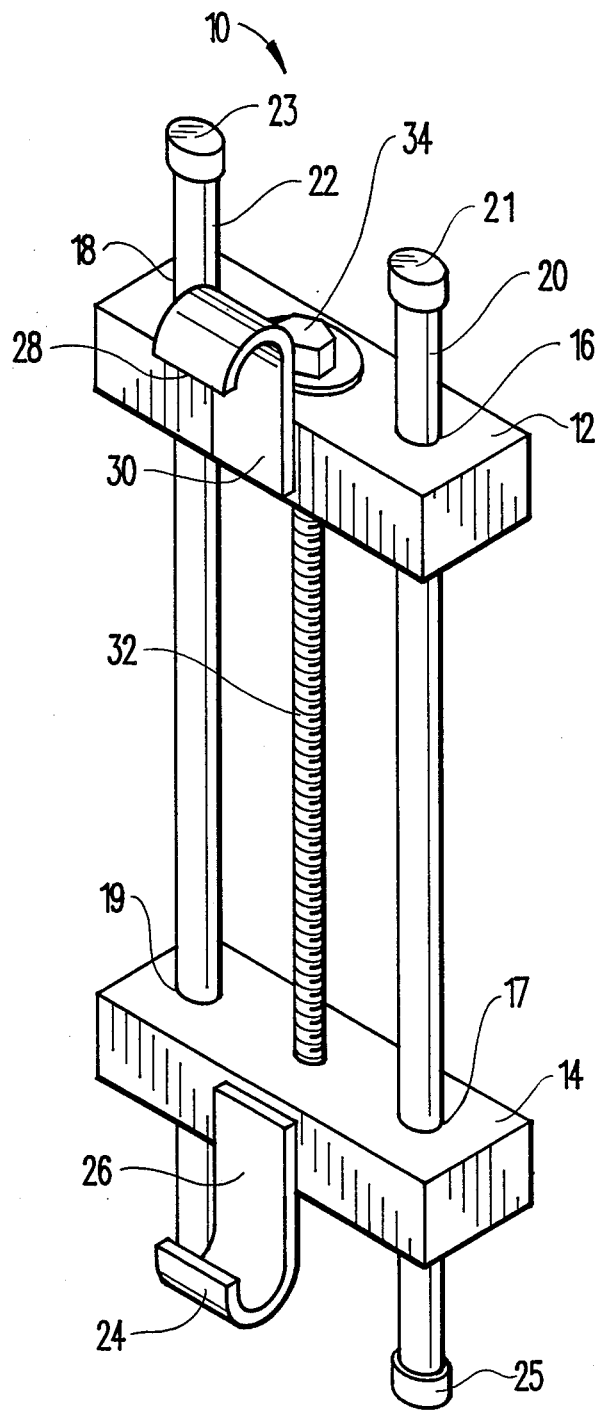
FIG. 1 is a perspective view of the coil spring compressing tool according to the present invention.

With reference now to the drawings, and in particular to FIG. 1 thereof, a new and improved coil spring compressing tool embodying the principles and concepts of the present invention and generally designated by the reference numeral 10 will be described.

More specifically, it will be noted that the first embodiment 10 of the invention includes a first elongated generally rectangular block 12 secured in spaced parallel relation with respect to a second elongated generally rectangular block 14. A first pair of aligned apertures 16 and 17 are formed through first end portions of the blocks 12 and 14 and slidably receive an elongated cylindrical guide rod 20. Enlarged stop members 21 and 25 are secured at opposite ends of the guide rod 20 to limit maximum axial separation of the blocks 12 and 14. A second pair of aligned apertures 18 and 19 are formed through second end portions of the blocks 12 and 14 and slidably receive a second guide rod 22. The guide rod 22 is provided with an enlarged retaining stop at each end, one of which is illustrated at 23. A threaded rod 32 extends transversely between the blocks 12 and 14, and through aligned central apertures provided in each of the blocks. An upper end of the threaded rod 32 is provided with a hexagonal driving head 34 to facilitate rotation by a conventional wrench. A pair of oppositely directed hooks 24 and 28 are secured at aligned locations on a side face of the blocks 12 and 14. The hook members 24 and 28 each include a tab end portion 26 and 30 which may be secured to the respective blocks 14 and 12 by conventional techniques such as welding.

Figures 2, 3:
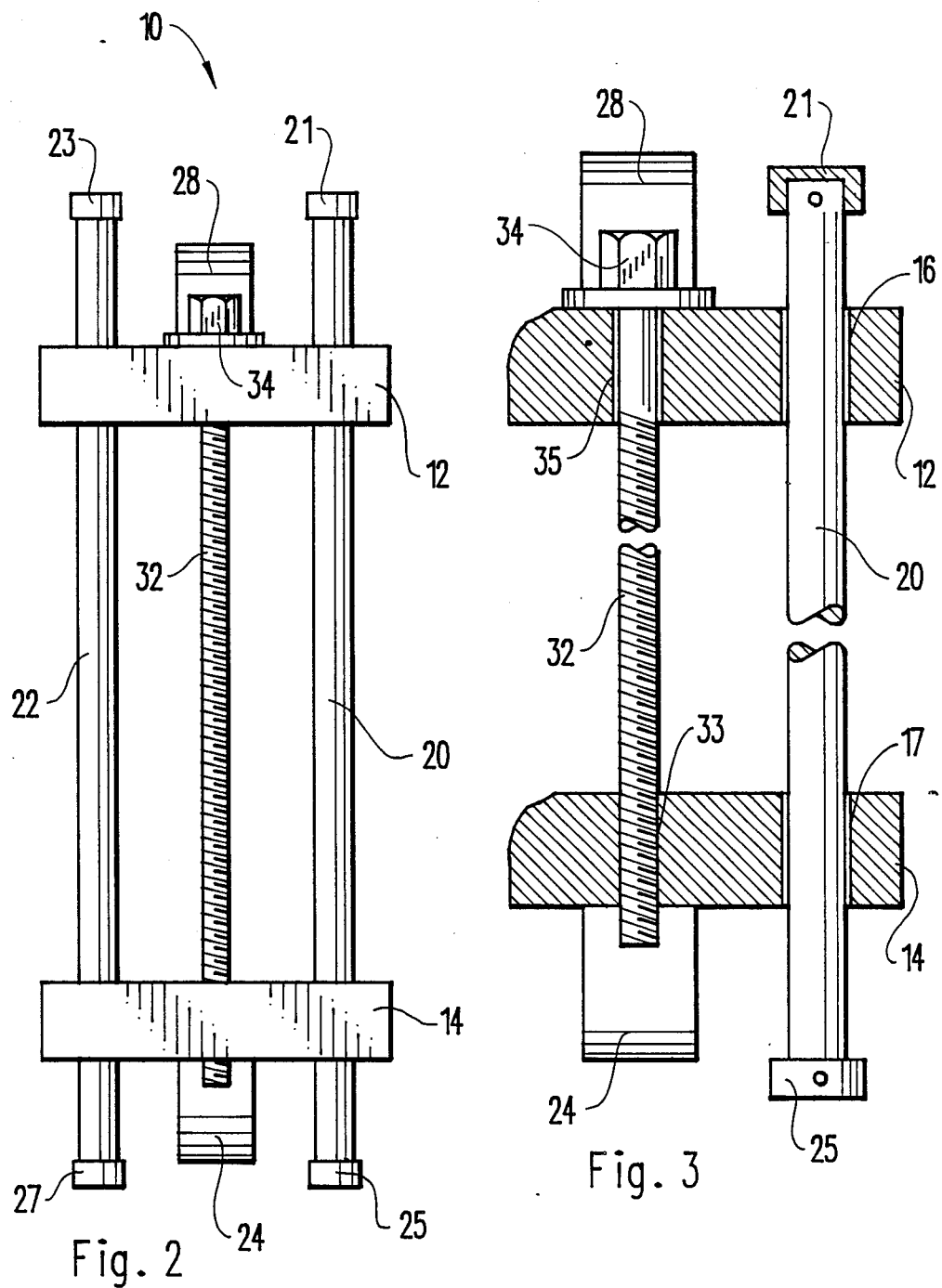
FIG. 2 is a back side elevational view of the coil spring compressing tool of FIG. 1.
FIG. 3 is a detail view, partially in cross section, further illustrating the construction of the coil spring compressing tool of the present invention.

FIG. 2 is a back side view of the spring compressing tool 10. It should be noted that the guide rods 20 and 22 and the location of the associated stop members 21, 25, 23 and 27 are selected so as to limit the maximum separation of the box 12 and 14 to prevent disengagement of the threaded rod 32 from the block 14.

As shown in FIG. 3, the rod 32 has an upper end portion extending through an oversized central bore 35 formed through the block 12. The upper end portion of the rod 32 is thus received for free rotation within the bore 35. The lower end of the rod 32 is received in threaded engagement within a threaded central bore 33 formed through the block 14. As may now be understood, rotation of the driving head 34 by a conventional wrench will cause relative linear movement of the blocks 12 and 14 along the guide rods 20 and 22.

Figure 4:
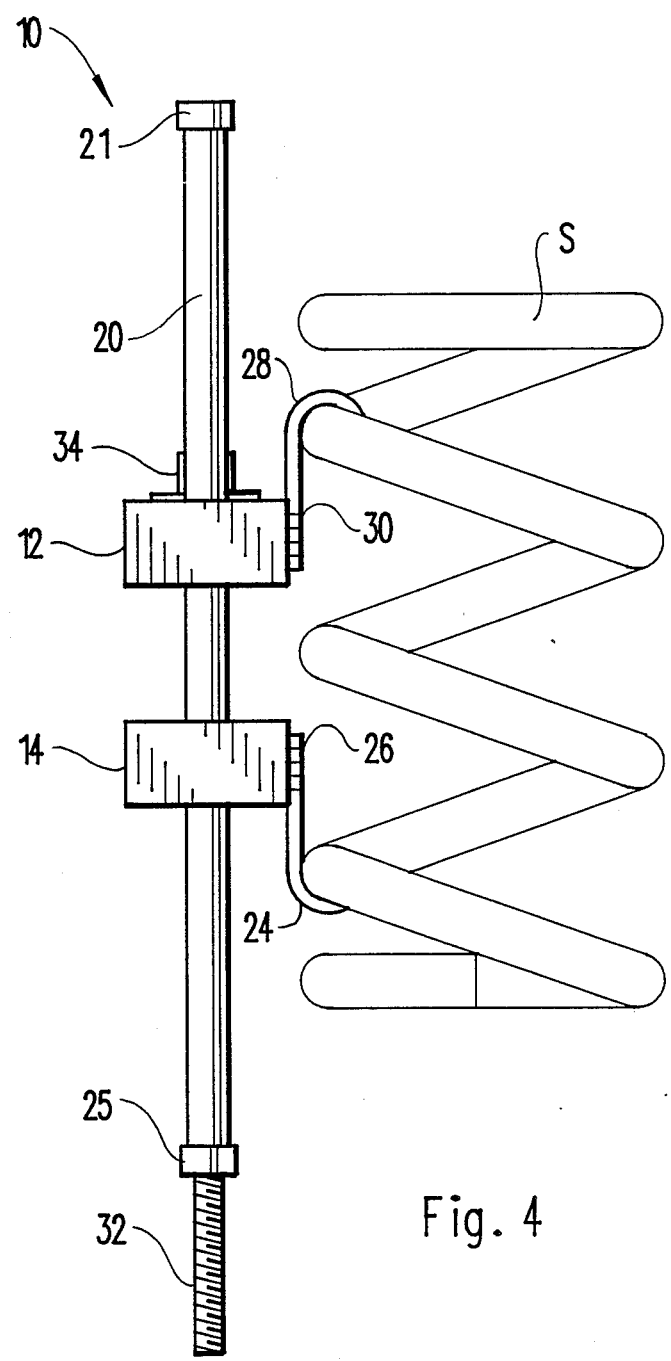
FIG. 4 is a side elevational view illustrating the manner of use of the spring compressing tool of the present invention.

FIG. 4 illustrates the manner of use of the spring compressing tool 10. The oppositely directed hook members 24 and 28 are placed into engagement with a coil portion of a vehicle suspension coil spring S. It should be noted that the coil spring S may be of the type associated with a suspension strut assembly. Rotation of the driving head 34 will then cause compression of the spring S. The assembly of the spring compressing tool 10 utilizing the centrally located threaded rod 32 in conjunction with the spaced guide rods 20 and 22 serves to prevent lateral or twisting movement of the blocks 12 and 14 during the spring compressing operation. This is an important safety feature which prevents the dangerous inadvertent release of a compressed coil spring. It should be noted that a pair of spring compressing tools 10 may be disposed at opposite sides of the spring S, if required.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A coil spring compressing tool, comprising:
    first and second elongated blocks extending in spaced parallel relation;
    a pair of aligned apertures formed through opposite ends of each of said blocks;
    a pair of guide rods slidably received through said apertures;
    an enlarged retaining stop at each end of each of said guide rods, said guide rods mounted for free axial independent sliding movement relative to each other and relative to each of said blocks within limits determined by said retaining stops;
    a central bore formed through said first block;
    a threaded bore formed centrally through said second block in coaxial alignment with said central bore;
    an elongated threaded rod having a first end portion received for free rotation in said central bore and a second end portion in threaded engagement with said threaded bore, said threaded bore extending in parallel relation between said guide rods;
    an enlarged driving head on said first end portion of said threaded rod for engagement with a wrench; and
    a pair of oppositely directed hooks secured at central aligned positions on side faces of said first and second blocks, between said guide rods and in alignment with said threaded rod, said hooks dimensioned for engagement with a coil spring.

* * * * *